United States Patent
Yang

(10) Patent No.: US 10,044,274 B2
(45) Date of Patent: Aug. 7, 2018

(54) PROTECTION CIRCUIT FOR POWER SUPPLY

(71) Applicant: INFINNO TECHNOLOGY CORP., Hsinchu County (TW)

(72) Inventor: Hui-Tsung Yang, Hsinchu County (TW)

(73) Assignee: Infinno Technology Corp., Jhubei, Hsinchu County (TW)

( * ) Notice: Subject to any disclaimer, the term of this patent is extended or adjusted under 35 U.S.C. 154(b) by 262 days.

(21) Appl. No.: 15/161,439

(22) Filed: May 23, 2016

(65) Prior Publication Data

US 2016/0352094 A1 Dec. 1, 2016

(30) Foreign Application Priority Data

May 26, 2015 (CN) .......................... 2015 2 0346254

(51) Int. Cl.
| | |
|---|---|
| *H02H 9/00* | (2006.01) |
| *H02M 3/335* | (2006.01) |
| *H02M 1/32* | (2007.01) |
| *H02H 3/20* | (2006.01) |

(52) U.S. Cl.
CPC ........ *H02M 3/33507* (2013.01); *H02H 3/207* (2013.01); *H02M 1/32* (2013.01)

(58) Field of Classification Search
USPC .......................................................... 361/18
See application file for complete search history.

(56) References Cited

U.S. PATENT DOCUMENTS

| | | | | |
|---|---|---|---|---|
| 6,141,232 A | * | 10/2000 | Weinmeier | H02M 3/33507 363/131 |
| 2007/0171685 A1 | * | 7/2007 | Yang | H02M 3/33507 363/21.12 |
| 2007/0194759 A1 | * | 8/2007 | Shimizu | H02J 7/0016 320/166 |
| 2008/0158915 A1 | * | 7/2008 | Williams | H02M 3/07 363/21.06 |
| 2009/0231883 A1 | * | 9/2009 | Osaka | H02M 3/155 363/15 |
| 2009/0262562 A1 | * | 10/2009 | Yang | H02M 1/4258 363/84 |
| 2013/0016535 A1 | * | 1/2013 | Berghegger | H02M 1/4258 363/21.15 |

(Continued)

*Primary Examiner* — Ronald W Leja
(74) *Attorney, Agent, or Firm* — Rosenberg, Klein & Lee

(57) ABSTRACT

A protection circuit for power supply is disclosed. The power supply includes a power conversion unit having a primary winding and a secondary winding. The primary winding receives an input voltage. The secondary winding is used for generating an output voltage. The protection circuit comprises a first impedance unit coupled to the secondary winding. A loading current of the power supply flows through the first impedance unit. The output voltage is generated at the first impedance unit. A second impedance unit is coupled to the secondary winding and generates a reference voltage. A comparison unit compares the output voltage and the reference voltage to generate a protection signal for turning off the power supply. A adjustment unit is coupled to the second impedance unit and the comparison unit and adjusts the magnitude of the reference voltage for controlling the comparison unit to output the protection signal.

10 Claims, 2 Drawing Sheets

(56) References Cited

U.S. PATENT DOCUMENTS

| | | | | |
|---|---|---|---|---|
| 2013/0134892 A1* | 5/2013 | Kado | ............... | H02M 3/33523 |
| | | | | 315/206 |
| 2014/0254213 A1* | 9/2014 | Matthews | ......... | H02M 3/33523 |
| | | | | 363/21.15 |
| 2015/0115919 A1* | 4/2015 | Yang | ...................... | H02M 1/32 |
| | | | | 323/282 |
| 2015/0326138 A1* | 11/2015 | Gurr | ...................... | H02M 7/06 |
| | | | | 363/126 |
| 2016/0352094 A1* | 12/2016 | Yang | ............... | H02M 3/33507 |

* cited by examiner

PROTECTION CIRCUIT FOR POWER SUPPLY

FIELD OF THE INVENTION

The present invention relates generally to a protection circuit, and particularly to a protection circuit for power supply.

BACKGROUND OF THE INVENTION

A protection circuit for power supply is normally included in a computer or other electric appliances, used for detecting if the power supply for a system is stable. When the power supply for the system is abnormal, the protection mechanism is activated real-timely, including shutting down the power supply or submitting alarm signals, so that the damage can be minimized. For high-end electronic products such as computers, the protection mechanism for power supply is particularly indispensable.

In the field of power supply, the protection circuit for the output voltage or the output current of the power supply is a very important circuit. It prevents improper output voltage or output current output by the power supply leading to permanent damages on products. The protection functions of the general protection circuit include the over-voltage protection, the under-voltage protection, and the over-loading protection. Among the above protection functions of the protection circuit, the over-loading protection is the most difficult to control precisely due to it includes many parameters. Particularly, the layout of the circuit board influences the protection result.

Nonetheless, for achieving accurate protection, the protection method of the protection circuit for power supply according to the prior art requires manual adjustment of protection parameters. The shortcomings of the method include high time consumption and low stability.

Accordingly, the present invention provides a novel protection circuit for power supply, which avoids manual adjustment of protection parameters for saving time and improving stability and thus solving the above problems.

BRIEF SUMMARY OF THE INVENTION

An objective of the present invention is to provide a protection circuit for power supply, which adjusts the magnitude of a reference voltage by an adjustment unit, and hence controlling a comparison unit to output a protection signal. Thereby, the purpose of protecting a product can be achieved.

Another objective of the present invention is to provide a protection circuit for power supply, which adjusts the magnitude of a reference voltage through a variable current source, and hence controlling a comparison unit to output a protection signal. Thereby, the purpose of protecting a product can be achieved.

A further objective of the present invention is to provide a protection circuit for power supply capable of increasing accuracy in protection.

The present invention provides a protection circuit for power supply. The power supply includes a power conversion unit. The power conversion unit includes a primary winding and a secondary winding. The primary winding receives an input voltage. The secondary winding is used for generating an output voltage. The protection circuit comprises a first impedance unit, a second impedance unit, a comparison unit, and an adjustment unit. The first impedance unit is coupled to the secondary winding of the power conversion unit, a loading current of the power supply flows through the first impedance unit, and the output voltage is generated at the first impedance unit. The second impedance unit is coupled to the secondary winding of the power conversion unit, and generates a reference voltage. The comparison unit is coupled to the first impedance unit and the second impedance unit, and compares the output voltage and the reference voltage to generate a protection signal for turning off the power supply. The adjustment unit is coupled to the second impedance unit and the comparison unit, and generates a reference current to adjust the magnitude of the reference voltage for controlling the comparison unit to output the protection signal.

According to the present invention, the comparison unit is coupled to a control circuit. The comparison unit transmits the protection signal to the control circuit. The control circuit turns off the power supply according to the protection signal.

According to the present invention, the control circuit generates a switching signal, which switches a switch to switch the power conversion unit for generating the output voltage. The switch is coupled to the primary winding. The control circuit disables the switching signal according to the protection signal for turning off the power supply.

According to the present invention, the comparison unit compares the output voltage with the reference voltage. When the output voltage is lower than the reference voltage, the comparison unit generates the protection signal.

According to the present invention, the adjustment unit is a variable current source for controlling the second impedance unit to generate the reference voltage according to the reference current output by the variable current source.

According to the present invention, the reference current of the variable current source starts to gradually decrease from the maximum value.

According to the present invention, an impedance value of the first impedance unit is constant.

According to the present invention, an impedance value of the second impedance unit is constant.

According to the present invention, the comparison unit is an operational amplifier.

According to the present invention, the first impedance unit and the second impedance unit are resistors.

According to the present invention, the adjustment unit generates the reference current to adjust the magnitude of the reference voltage for controlling the comparison unit to output the protection signal, that achieves the purpose of product protection.

DETAILED DESCRIPTION OF EMBODIMENTS

In order to make the structure and characteristics as well as the effectiveness of the present invention to be further understood and recognized, the detailed description of the present invention is provided as follows along with embodiments and accompanying figures.

Figure 1:
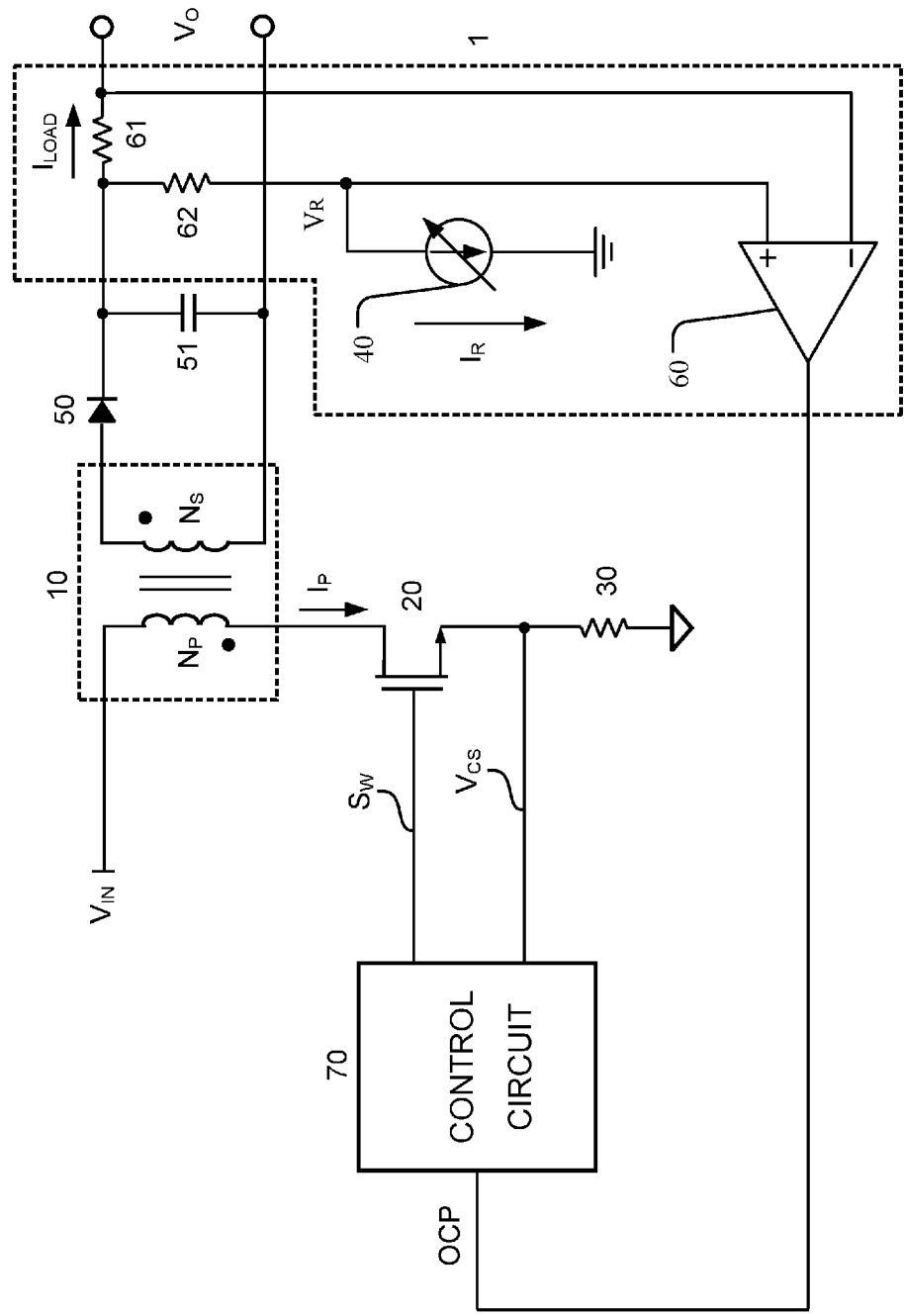
FIG. 1 shows a circuit diagram of the protection circuit for power supply according to an embodiment of the present invention.

Please refer to FIG. 1, which shows a circuit diagram of the protection circuit for power supply according to an embodiment of the present invention. As shown in the figure, the protection circuit 1 for power supply according to the present invention may be applied in over-voltage, under-voltage, short-circuit, and over-loading protections. According to the present embodiment, the application is the over-voltage protection. The protection circuit 1 according to the present embodiment detects the voltage of the secondary side of the power supply. In other words, the protection circuit 1 according to the present invention is coupled to the output terminal of the power supply for providing protection. The protection circuit 1 according to the present invention comprises a first impedance unit 61, a second impedance unit 62, a comparison unit 60, and an adjustment unit 40. The power supply comprises a power conversion unit 10, a switch 20, a current sensing resistor 30, and a control circuit 70.

According to an embodiment of the present invention, the power conversion unit 10 is a transformer, which includes a primary winding $N_P$ and a secondary winding $N_S$. One terminal of the primary winding $N_P$ receives an input voltage $V_{IN}$ of the power supply. The secondary winding $N_S$ is used for generating an output voltage $V_O$. The power conversion unit 10 is used to convert the input voltage $V_{IN}$ of the power supply for generating the output voltage $V_O$. The switch 20 is coupled to the other terminal of the primary winding $N_P$ to switch the power conversion unit 10 for generating the output voltage $V_O$. According to an embodiment of the present invention, the switch 20 may be a power transistor. The current sensing resistor 30 is coupled between the switch 20 and the ground and used for sensing a switching current $I_P$ flowing through the switch 29 and generating a current sensing signal $V_{CS}$. The current sensing signal $V_{CS}$ is correlated to the switching current $I_P$. The control circuit 70 receivers the current sensing signal $V_{CS}$ and generates a switching signal $S_W$ according to the current sensing signal $V_{CS}$. The switching signal $S_W$ switches the switch 20, which switches the power conversion unit 10 for generating the output voltage $V_O$.

An anode of a diode 50 is coupled to one terminal of the secondary winding $N_S$. A capacitor 51 is coupled between a cathode of the diode 50 and the other terminal of the secondary winding $N_S$. The diode 50 and the capacitor 51 are used for generating the output voltage $V_O$. A first terminal of the first impedance unit 61 is coupled to the cathode of the diode 50 and the capacitor 51. That is, the first impedance unit 61 is coupled to the secondary winding $N_S$ of the power conversion unit 10, and therefore is coupled to the output terminal of the power supply. A loading current $I_{LOAD}$ output by the power supply flows through the first impedance unit 61. The output voltage $V_O$ is generated at a second terminal of the first impedance unit 61. A first terminal of the second impedance unit 62 is coupled to the joint of the cathode of the diode 50, the capacitor 51, and the first terminal of the first impedance unit 61. That is, the second impedance unit 62 is coupled to the secondary winding $N_S$ of the power conversion unit 10. In addition, the second impedance unit 62 generates a reference voltage $V_R$ according to the loading current $I_{LOAD}$ output by the power supply. The comparison unit 60 is coupled to the second terminal of the first impedance unit 61 and the second terminal of the second impedance unit 62 to receive and compare the output voltage $V_O$ and the reference voltage $V_R$ for generating a protection signal OCP. The protection signal OCP is used for turning off the power supply and thus achieving protection. According to an embodiment of the present invention, an impedance value of the first impedance unit 61 and an impedance value of the second impedance unit 62 are constant, respectively. The first and second impedance units 61, 62 are resistors.

According to an embodiment of the present invention, the comparison unit 60 is an operational amplifier. The comparison unit 60 includes a positive input terminal, a negative input terminal, and an output terminal. The negative input terminal of the comparison unit 60 is coupled to the second terminal of the first impedance unit 61 to receive the output voltage $V_O$. The positive input terminal is coupled to the second terminal of the second impedance unit 62 to receive the reference voltage $V_R$ output by the second impedance unit 62. The positive input terminal is further coupled to the adjustment unit 40. After the comparison unit 60 receives the output voltage $V_O$ and the reference voltage $V_R$, it compares the magnitudes of the output voltage $V_O$ and the reference voltage $V_R$. When the output voltage $V_O$ is lower than the reference voltage $V_R$, which means the output voltage $V_O$ generated by the power supply is in the over-voltage condition, the comparison unit 60 outputs the protection signal OCP at its output terminal. The output terminal of the comparison unit 60 is coupled to the control circuit 70. The protection signal OCP is then transmitted to the control circuit 70. The control circuit 70 disables the switching signal $S_W$ according to the protection signal OCP for turning off the power supply and thus achieving the purpose of protection.

The adjustment unit 40 is coupled to the second terminal of the second impedance unit 62 and the comparison unit 60 and adjusts the magnitude of the reference voltage $V_R$. The adjustment unit 40 is used to generate a reference current $I_R$ for controlling a threshold value of outputting the protection signal OCP of the comparison unit 60. According to the present embodiment, the adjustment unit 40 is a variable current source used for controlling the second impedance unit 62 to generate the reference voltage $V_R$ according to the reference current $I_R$. That is to say, the magnitude of the reference current $I_R$ output by the adjustment unit 40 determines the magnitude of the reference voltage $V_R$ output by the second impedance unit 62. Namely, as the reference current $I_R$ output by the adjustment unit 40 decreases, the reference voltage $V_R$ output by the second impedance unit 62 increases accordingly. According to an embodiment of the present invention, the reference current $I_R$ of the variable current source starts to gradually decrease from the maximum value.

Accordingly, the adjustment unit 40 according to the present invention is used to adjust the magnitude of the reference voltage $V_R$, and thereby controlling the comparison unit 60 to output the protection signal OCP for achieving the purpose of product protection.

Figure 2:
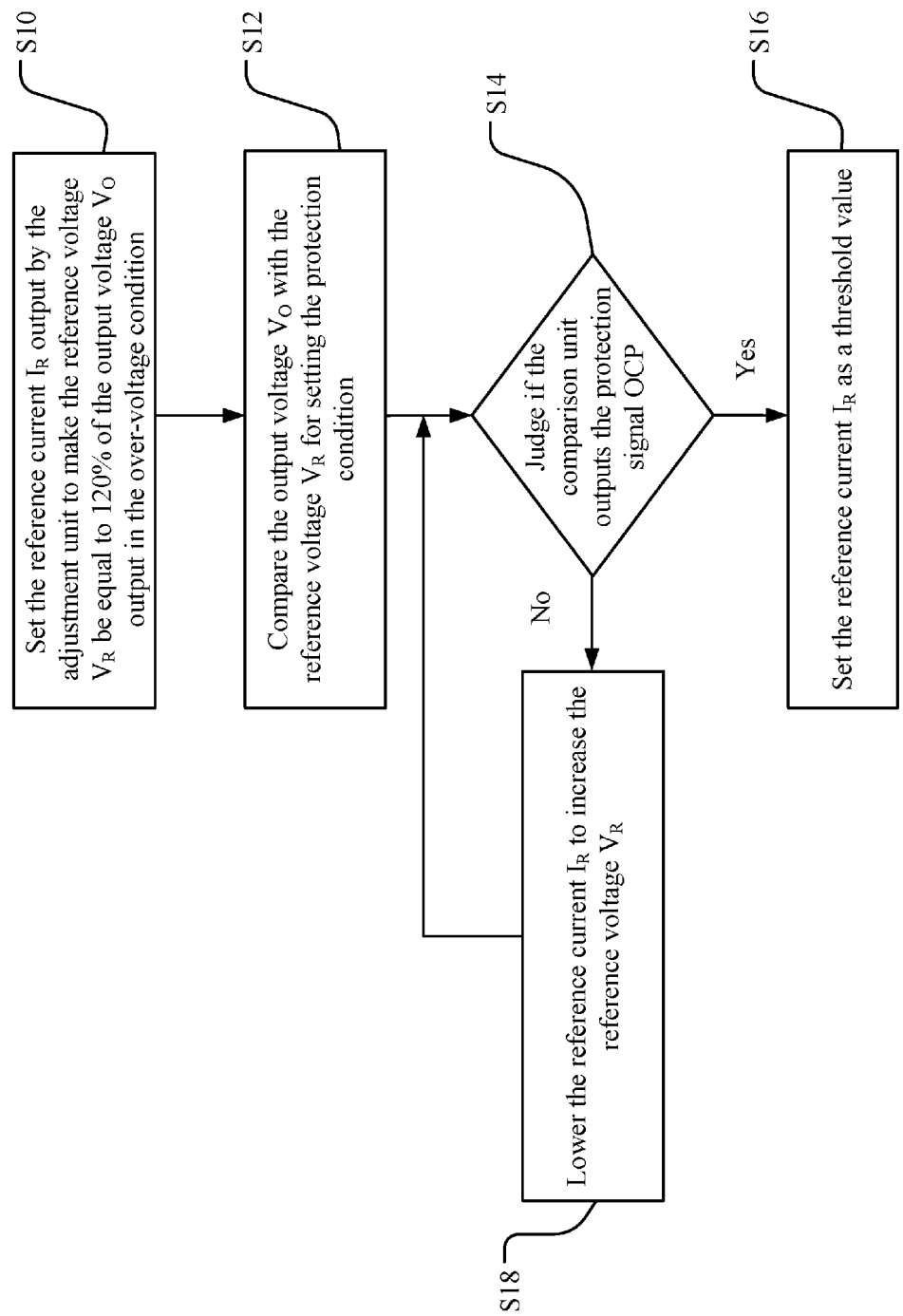
FIG. 2 shows a flowchart of setting the reference current of an adjustment unit in the protection circuit according to an embodiment of the present invention.

Please refer to FIG. 2, which shows a flowchart of setting the reference current of the adjustment unit in the protection circuit according to an embodiment of the present invention. As shown in the figure, the process of the adjustment unit 40 according to the present embodiment setting the reference current $I_R$ output by the adjustment unit 40 starts from the step S10, in which the reference current $I_R$ output by the adjustment unit 40 is set to make the reference voltage $V_R$ be 120% of the output voltage $V_O$ output in the over-voltage condition. In other words, the reference current $I_R$ output by the adjustment unit 40 is first configured to make the reference voltage $V_R$ be a certain multiple of the output voltage $V_O$ output by the power supply in the over-voltage condition. That is, the reference voltage $V_R$ is higher than the output voltage $V_O$ output by the power supply in the over-voltage condition. It prevents that the initial value of the reference voltage $V_R$ is lower than the output voltage $V_O$ output by the power supply in the over-voltage condition from happening. If this happens, the power supply will be in the over-voltage condition and the load, namely, the product, will burn.

Afterwards, the step S12 is executed for comparing the output voltage $V_O$ with the reference voltage $V_R$ and setting the protection condition. In other words, after setting the reference current $I_R$, compare the output voltage $V_O$ with the reference voltage $V_R$. Next, the step S14 is executed for judging if the comparison unit 60 outputs the protection signal OCP. As shown in the step S16, when the output voltage Vo is lower than the reference voltage $V_R$, the comparison unit 60 outputs the protection signal OCP. At this moment, because the output voltage $V_O$ output by the power supply is in the over-voltage condition, the protection signal OCP is detected, the reference current $I_R$ can be set as a threshold value. Namely, the reference current $I_R$ at this moment enables the reference voltage $V_R$ generated by the second impedance unit 62 to be used as the threshold value of over-voltage protection for the output of the power supply. Besides, as shown in the step S18, as the output voltage Vo is higher than the reference voltage $V_R$, the protection signal OCP will not be detected. It means that the current setting for the reference current $I_R$ is too high; it is required to lower the reference current $I_R$ in order to increase the reference voltage $V_R$ to be equal to the output voltage $V_O$ output by the power supply in the over-voltage condition. Thereby, the appropriate reference current $I_R$ can be configured. According to the present embodiment, the reference current $I_R$ is lowered in each cycle to increase the reference voltage 2%. The step S14 is repeated until the appropriate reference current $I_R$ is configured.

To sum up, the present invention provides a protection circuit for power supply. The power supply includes a power conversion unit. The power conversion unit includes a primary winding and a secondary winding. The primary winding receives an input voltage. The secondary winding is used for generating an output voltage. The protection circuit comprises a first impedance unit, a second impedance unit, a comparison unit, and an adjustment unit. The first impedance unit is coupled to the secondary winding of the power conversion unit. A loading current of the power supply flows through the first impedance unit. The output voltage is generated at the first impedance unit. The second impedance unit is coupled to the secondary winding of the power conversion unit and generates a reference voltage. The comparison unit is coupled to the first impedance unit and the second impedance unit, and compares the output voltage and the reference voltage to generate a protection signal for turning off the power supply. The adjustment unit is coupled to the second impedance unit and the comparison unit and generates a reference current to adjust the magnitude of the reference voltage for controlling the comparison unit to output the protection signal. Thus, the adjustment unit is used to adjust the magnitude of the reference voltage for controlling the comparison unit to output the protection signal, that achieves the purpose of product protection.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

What is claimed is:

1. A protection circuit for power supply, the power supply includes a power conversion unit and said power conversion unit includes a primary winding and a secondary winding; said primary winding receives an input voltage; and said secondary winding is used for generating an output voltage, and said protection circuit comprising:
   a first impedance unit, coupled to said secondary winding of said power conversion unit, a loading current of said power supply flowing through said first impedance unit, and said output voltage generated at said first impedance unit;
   a second impedance unit, coupled to said secondary winding of said power conversion unit, and generating a reference voltage;
   a comparison unit, coupled to said first impedance unit and said second impedance unit, and comparing said output voltage and said reference voltage to generate a protection signal for turning off said power supply; and
   an adjustment unit, coupled to said second impedance unit and said comparison unit, generating a reference current to adjust the magnitude of said reference voltage for controlling said comparison unit to output said protection signal.

2. The protection circuit as claimed in claim 1, wherein said comparison unit is coupled to a control circuit; said comparison unit transmits said protection signal to said control circuit; and said control circuit turns off said power supply according to said protection signal.

3. The protection circuit as claimed in claim 2, wherein said control circuit generates a switching signal; said switching signal switches a switch to switch said power conversion unit for generating said output voltage; said switch is coupled to said primary winding; and said control circuit disables said switching signal according to said protection signal for turning off said power supply.

4. The protection circuit as claimed in claim 1, wherein said comparison unit compares said output voltage with said reference voltage; and said comparison unit generates said protection signal when said output voltage is lower than said reference voltage.

5. The protection circuit as claimed in claim 1, wherein said adjustment unit is a variable current source for controlling said second impedance unit to generate said reference voltage according to said reference current output by said variable current source.

6. The protection circuit as claimed in claim 5, wherein said reference current of said variable current source starts to gradually decrease from a maximum value.

7. The protection circuit as claimed in claim 1, wherein an impedance value of said first impedance unit is constant.

8. The protection circuit as claimed in claim 1, wherein an impedance value of said second impedance unit is constant.

9. The protection circuit as claimed in claim 1, wherein said comparison unit is an operational amplifier.

10. The protection circuit as claimed in claim 1, wherein said first impedance unit and said second impedance unit are resistors.

* * * * *